United States Patent [19]

Davies et al.

[11] 4,138,220
[45] Feb. 6, 1979

[54] APPARATUS FOR CATALYTIC OXIDATION OF GREASE AND FATS IN LOW TEMPERATURE FUMES

[75] Inventors: Ronald F. Davies; John P. Manly, both of Elkton, Md.

[73] Assignee: Colonial Metals, Inc., Elkton, Md.

[21] Appl. No.: 877,474

[22] Filed: Feb. 13, 1978

[51] Int. Cl.² .......................... B01J 8/02; B01J 35/04
[52] U.S. Cl. ..................................... 422/173; 422/177
[58] Field of Search ............ 23/288 R, 288 J, 288 F, 23/288 FC, 288 FB

[56] References Cited

U.S. PATENT DOCUMENTS

| | | | |
|---|---|---|---|
| 2,396,190 | 3/1946 | Morgan et al. | 23/288 F UX |
| 3,253,400 | 5/1966 | Hass | 23/288 F UX |
| 3,490,878 | 1/1970 | Russell | 23/288 F UX |
| 3,597,165 | 6/1971 | Keith et al. | 23/288 FC |
| 3,607,131 | 9/1971 | Williams et al. | 23/288 F UX |
| 3,690,840 | 9/1972 | Volker | 23/288 F X |
| 3,755,534 | 8/1973 | Graham | 23/288 FC UX |
| 3,761,229 | 9/1973 | Schwartz | 23/288 F |
| 3,779,710 | 12/1973 | Burstein et al. | 23/288 F |
| 3,785,778 | 1/1974 | Burstein et al. | 23/288 FC UX |
| 3,798,005 | 3/1974 | Koch | 23/288 FC X |
| 3,817,716 | 6/1974 | Betz | 23/288 F |
| 3,917,444 | 11/1975 | Carthew | 23/288 F X |

Primary Examiner—Morris O. Wolk
Assistant Examiner—Michael S. Marcus
Attorney, Agent, or Firm—Walter G. Finch

[57] ABSTRACT

Method and apparatus for catalytically oxidating grease, fats, oils and/or other hydrocarbons in fumes rising from a source thereof. In particular, grease and odor-laden air streams, i.e. hydrocarbon-laden air streams, emanating from a source such as a cooking grill or the like are heated to a temperature at which passage over a catalyst causes flameless oxidation of the organic material in the air stream at a temperature below combustion temperature, the organic material being converted essentially to carbon dioxide and water, with release of at least some heat energy. The oxidized and heated air stream is ducted in countercurrent relation or in identically parallel direction, to the relatively cooler hydrocarbon-laden air stream which is being ducted toward the catalyst, heat exchange from the oxidized air stream to the hydrocarbon-laden air stream thereby occurring to at least partially heat the hydrocarbon-laden air stream. Additional heat energy can also be introduced if necessary into the unoxidized air stream prior to passage over the catalyst in order to raise the temperature of the airstream to the operating temperature of the catalyst.

12 Claims, 15 Drawing Figures

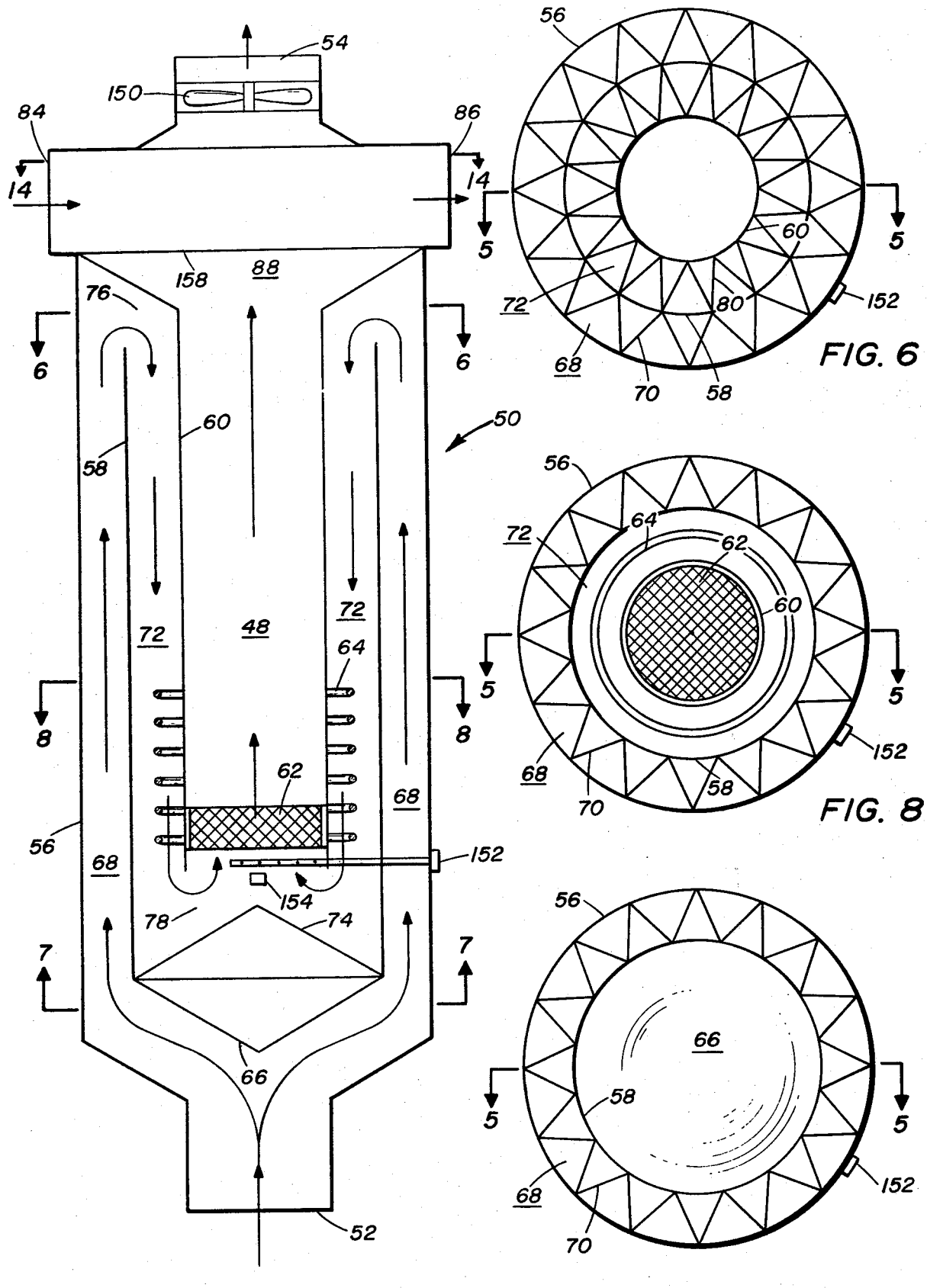

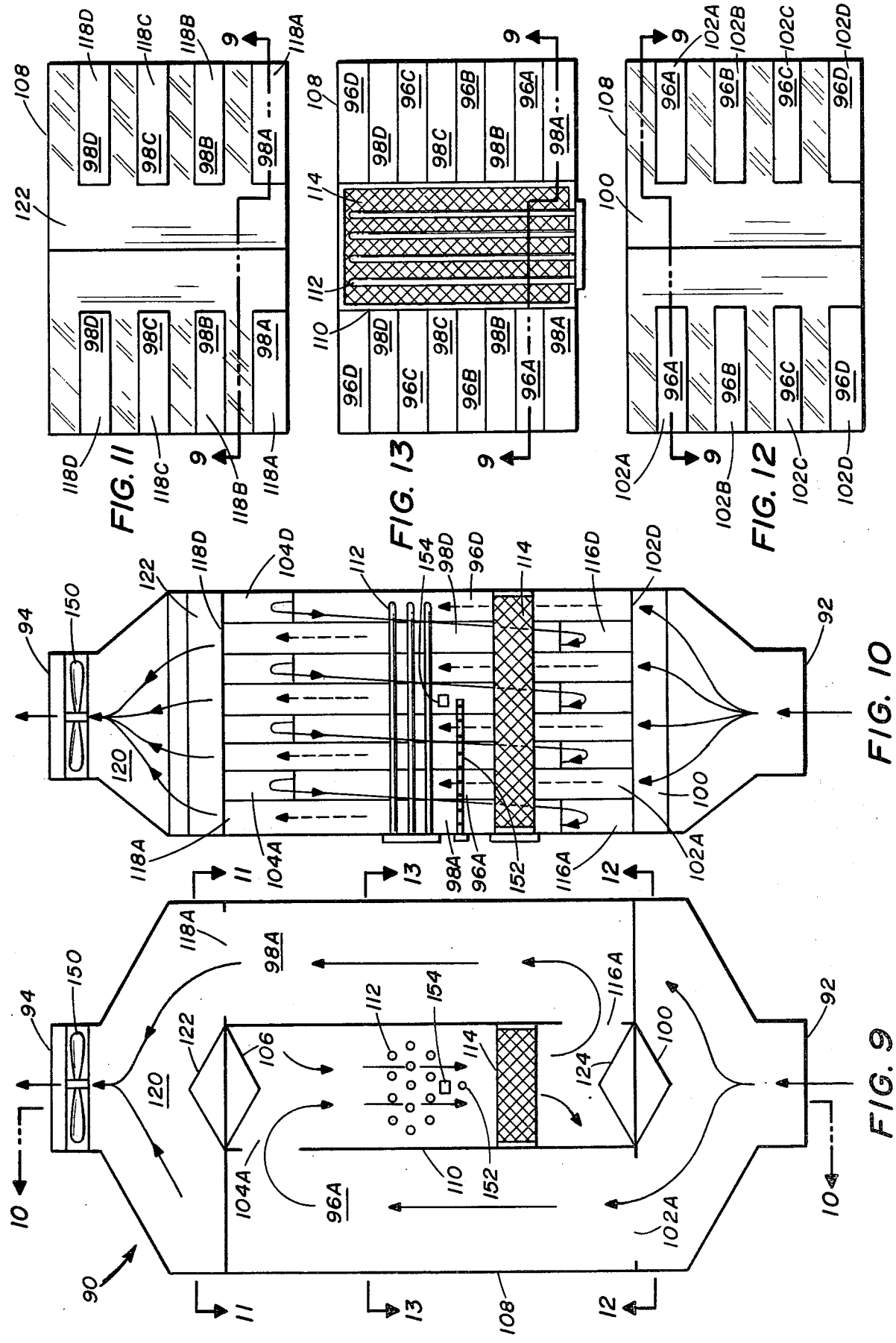

APPARATUS FOR CATALYTIC OXIDATION OF GREASE AND FATS IN LOW TEMPERATURE FUMES

BACKGROUND AND SUMMARY OF THE INVENTION

Air streams emitted from various commercial processes, such as cooking with greases and the like in a restaurant, typically contain greases, long chain fats, oils, or other hydrocarbons in the form of vapor or fine dispersions which produce disagreeable smoke and odor when vented directly into the atmosphere. Especially in restaurant cooking operations, these hydrocarbon-laden air streams are normally vented directly into the atmosphere immediately outside of the commercial establishment, the fumes and odors characteristic of these discharged air streams being objectionable and undesirable.

Hydrocarbon-laden air streams from a variety of commercial and industrial processes have long been vented directly into the atmosphere with little or no treatment thereof prior to discharge from the source. However, some attempts have been and are being made to remove the organic materials from these air streams. Filtration of grease-laden air streams has been pursued. However, disposal of the grease-laden filter media presents an additional problem. A process known as "wet-scrubbing" has been suggested and is effective for removal of grease from hydorcarbon-laden air streams but does little to remove odors from the air streams. Further, disposal of grease-laden waste water from this process presents a vexing environmental problem. Incineration of the organic materials in a hydrocarbon-laden air stream has, of course, been accomplished. However, such open-flame processes require tremendous amounts of energy and present inordinately serious fire hazards, especially when used in and around areas where people are present, such as in a restaurant.

The present invention provides a method and apparatus for catalytically oxidizing grease, fats, oils, and/or other hydrocarbons in an air stream emanating from a source, such as from a cooking grill in a restaurant. The invention is particularly useful in those situations where hydrocarbon-laden air streams are emitted from a source at a temperature lower than the nominal operating temperature of a catalyst which is intended to flamelessly oxidize the organic materials in the air stream. The invention renders catalytic oxidative treatment of such hydrocarbon-laden air streams both efficient and economical, especially from the standpoint of energy conservation. In fact, in the operation of the present invention, heat released from the flameless catalytic oxidation of the organic material in the air stream is effectively utilized to at least partially heat the hydrocarbon-laden air stream to the operating temperature of the catalyst prior to passage of the air stream over the catalyst.

The invention generally comprises apparatus which ducts a hydrocarbon-laden air stream at a temperature below the operating temperature of a given catalyst in countercurrent relation or in identically parallel direction, to the relatively hot processed air stream exiting from treatment by the catalyst. As an example, grease and odor-laden air rising from a cooking grill has a temperature substantially less than the 350°–475° F necessary for flameless oxidation by a catalyst such as the well-known and efficient platinum-based catalysts. This relatively low temperature and unprocessed air stream is passed through a heat exchange apparatus prior to passage over the catalyst, the heat exchange apparatus being operatively ducted to the processed and relatively more hot air stream passing from the catalyst. The processed air stream is relatively more hot due at least in part to heat released on flameless oxidation of the hydrocarbons in the air stream on passage over the catalyst. Heat can also be introduced into the unprocessed air stream after passage through the heat exchange apparatus and before passage over the catalyst to bring the unprocessed air stream to a desired temperature. Most of this introduced heat is also present in the processed air stream and is transferred in the heat exchange apparatus to the unprocessed air stream. The present invention both recovers at least some of the heat which is introduced into the unprocessed air stream and provides for generation of additional heat from its own catalytic operation, this recovered and generated heat being utilized to heat a relatively cool unprocessed and organic-laden air stream to a temperature suitable for flameless oxidation by a suitable catalyst. The energy savings thus effected render the invention economical for commercial use. The processed air stream, which is still at a high temperature relative to ambient after passage through the heat exchange apparatus, can be used to heat the building in which the invention is being used or to air condition said building through use of heat absorption refrigeration techniques, or for heating water for use in the commercial process, washrooms, etc. Essentially, the heated processed air stream resulting from the process of the invention can itself be utilized to render the invention even more economical.

The present invention also provides a convenient process for disposing of greases and similar hydrocarbons which typically accumulate in commercial establishments, such as restaurants, which have need for the invention, In essence, this accumulated grease can be used as a "fuel" in the apparatus of the invention, thereby disposing of the waste organics while simultaneously adding heat energy to the processed air stream, which heat energy is utilized to raise the temperature of the unprocessed hydrocarbon-laden air stream as aforesaid. The invention is carried out in these several embodiments at a temperature substantially lower than the flame temperature of the hydrocarbons which are removed from the air stream, the operation of the invention being flameless. Thus, the invention provides a method and apparatus which is significantly more safe in use and which can be utilized in situations where the proximity of combustible materials would present an extreme fire hazard in the presence of open flames.

Accordingly, it is a primary object of the invention to provide a method and apparatus for catalytically oxidizing hydrocarbon-laden air streams which result from commercial and industrial process, such as from a cooking grill in a restaurant.

It is a further object of the invention to provide an economical and energy conserving method and apparatus for efficiently heating relatively low-temperature hydrocarbon-laden air streams to a temperature within the operating range of a catalyst, such heating being accomplished at least in part by heat exchange between the relatively more hot processed air stream exiting from the catalyst.

It is another object of the invention to provide a method and apparatus for flamelessly oxidizing noxious components of cooking or other hydrocarbon-laden air streams essentially to carbon dioxide and water.

It is yet another object of the invention to provide a method for disposal of accumulated greases, oils, and the like from a commercial establishment while simultaneously providing heat energy to a process for catalytically oxidizing hydrocarbon-laden air streams.

It is still another object of the invention to provide a method of utilizing the heat generated by the process for heating the building, air conditioning the building, or heating water for commercial or sanitary use to effectively conserve energy.

Further objects and advantages of the invention will become more apparent in light of the following detailed description of the preferred embodiments of the invention.

BRIEF DESCRIPTION OF THE INVENTION

FIG. 5 is an idealized schematic of an elevational cut-away view of a second embodiment of the invention;

FIG. 6 is an idealized section taken along line 6—6 of FIG. 5;

FIG. 7 is an idealized section taken along line 7—7 of FIG. 5;

FIG. 8 is an idealized section taken along line 8—8 of FIG. 5;

FIG. 9 is an idealized schematic of an elevational cut-away view of a third embodiment of the invention;

FIG. 10 is an idealized section taken along line 10—10 of FIG. 9;

FIG. 11 is an idealized section taken along line 11—11 of FIG. 9;

FIG. 12 is an idealized section taken along line 12—12 of FIG. 9;

FIG. 13 is an idealized section taken along line 13—13 of FIG. 9;

DESCRIPTION OF THE PREFERRED EMBODIMENTS

Figure 1:
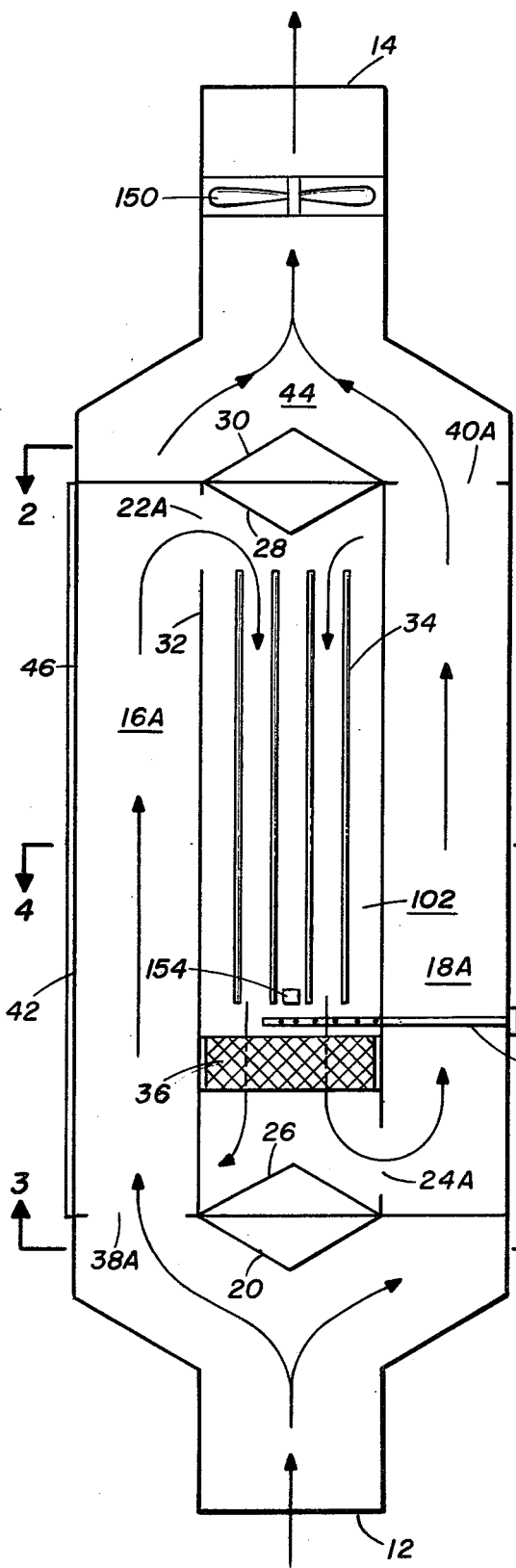
FIG. 1 is an idealized schematic illustrating an elevational cut-away view of a first embodiment of the invention.
Figure 2:
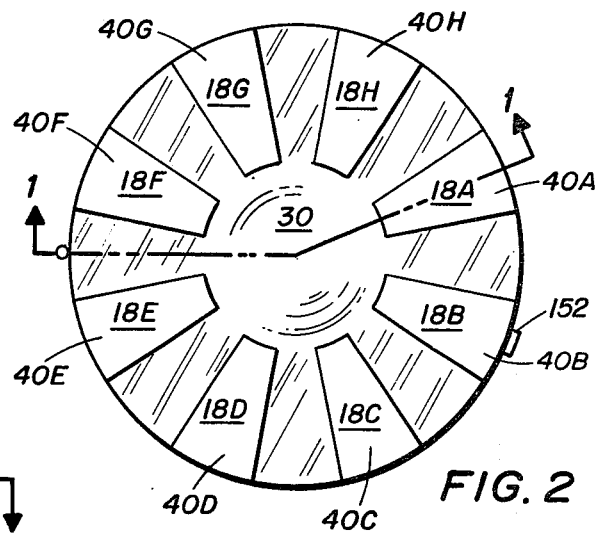
FIG. 2 is an idealized section taken along line 2—2 of FIG. 1.
Figure 4:
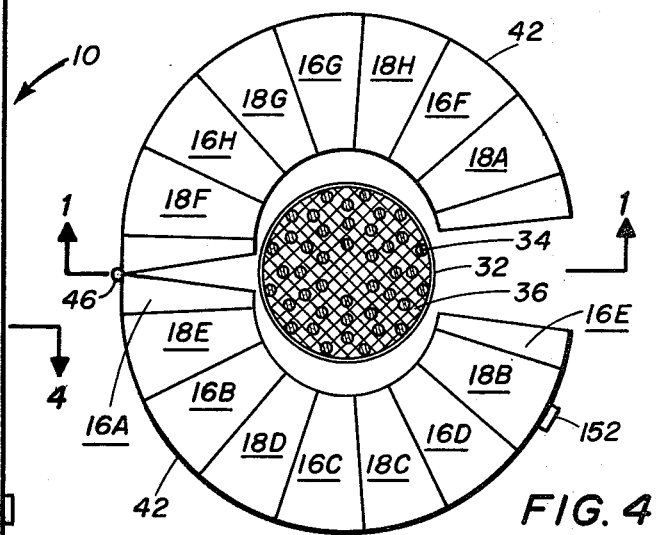
FIG. 4 is an idealized section taken along line 4—4 of FIG. 1, the drawing further illustrating the apparatus as hinged and open for maintenance.
Figure 3:
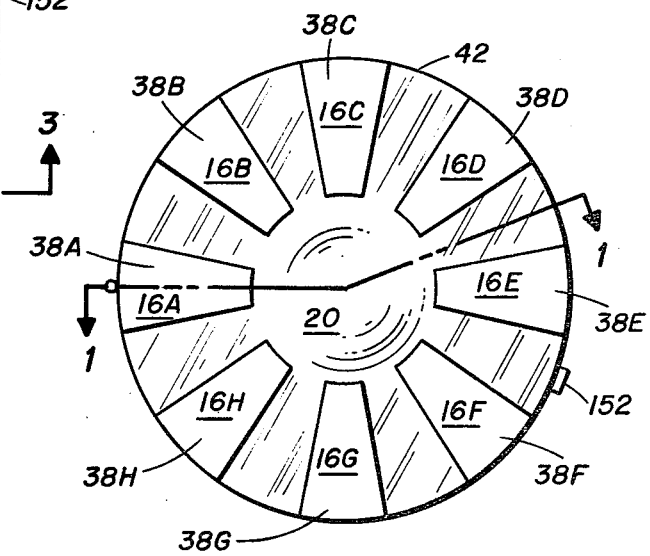
FIG. 3 is an idealized section taken along line 3—3 of FIG. 1.

The several embodiments of the invention shown in the drawings essentially operate according to the method of the invention, the structures shown being merely illustrative since a variety of other structures, particularly heat exchange structures, could be used in the practice of the invention without departing from the scope of the invention. As noted hereinabove, the invention contemplates catalytic oxidation of hydrocarbons entrained in an air stream emanating from a process, such as cooking on a grill, deep fat frying, heat stripping of oils from metal scraps, poultry or meat processing, etc. It is to be understood that reference herein to a "hydrocarbon-laden air stream" refers to a flow of air having greases, oils, fats, and the fumes and odors characteristic thereof entrained in the flow of air, the flow of air or stream typically emanating from a commercial or industrial process and being normally vented directly into the atmosphere. The present invention embodies methodology and apparatus for treating such "unprocessed" hydrocarbon-laden air streams between the sources thereof and the venting of the air streams to the atmosphere to catalytically oxidize the hydrocarbons, i.e., at least the main portion of the organic material, in the air streams to produce a "processed" air stream which is relatively free of noxious fumes and odors and which can be vented to the atmosphere without damage to or diminution of the quality of the environment. Reference hereinafter to an "unprocessed" air stream indicates an air stream bearing hydrocarbons such as grease and the fumes and odors associated therewith. A "processed" air stream indicates an air stream in which the hydrocarbons and the like have been catalytically oxidized essentially to carbon dioxide and water.

The invention can and will be described as an apparatus which is suitable for installation in the hood or venting ducts over a cooking grill such as is used in restaurants and, in particular, in those restaurants of the "fast food" type in which great quantities of grilled foods are cooked and which coincidentally produce substantial quantities of grease and odor-laden air which must be vented from the restaurant. However, it is to be understood that the invention provides economical and energy conserving means for flameless oxidation of hydrocarbons and other organic materials in air streams which are produced from other commercial, industrial, or domestic processes. The invention is particularly useful and cost effective when the hydrocarbon-laden air stream is produced at a temperature lower than the operating temperature or temperature range of an oxidizing catalyst, such as the platinum-bearing catalyst preferred for use with the invention. The invention provides efficient, inexpensive, and energy conserving means for elevating the temperature of the unprocessed air stream substantially to or toward the temperature necessary for flameless oxidation by the catalyst by passing the unprocessed air stream in countercurrent heat exchanging relationship, or in identically parallel direction, to the processed air stream in which the organic materials have been oxidized by the catalyst. The catalytic oxidation process actually supplies additional heat energy to the processed airstream, the oxidation of the hydrocarbons being the means of providing additional heat energy to the processed air stream. This additional heat energy is at least in part transferred to incoming quantities of unprocessed air, thereby "self-fueling" the oxidative reaction. In most situations in which the invention is useful, additional heat is supplied either continuously or intermittently to the air stream by auxiliary heating elements, such as of the electrical type, prior to passage of the unprocessed air over the catalyst. The use of electrical type elements as stated is not to preclude the use of gas type auxiliary heaters where provided in an engineering design. This additional heat is introduced into the unprocessed air stream after said air stream has undergone heat exchange with the relatively more hot processed air stream and prior to passage over the catalyst. The heat introduced by the heating elements can be considered to be supplementary and is recovered at least in part through transfer to incoming quantities of unprocessed hydrocarbon-laden air within the heat exchange apparatus of the invention.

The processed air stream exiting the heat exchange apparatus is still sufficiently heated to be useful in the production of useful work, such as direct air heating, cooling by absorption refrigeration, water heating, etc.

Considering now the catalyst and catalyst substrate structure which is useful in the practice of the invention, it is to be understood that catalysts and substrate structures other than that specifically described for illustration herein can be utilized without departing from the scope of the invention. Various catalysts capable of flameless oxidation of greases, oils, etc. and the fumes and odors characteristic thereof can be used, different catalysts having different operating temperature ranges and being most effective for different hydrocarbons at differing sub-ranges within the operating temperature ranges thereof.

A preferred caalytic system comprises a honey-comb substrate of refractory material which is coated with a platinum-containing catalyst. The honey-comb substrate offers a large surface area for coating by the catalyst and, thus, a large effective surface area for contact between the catalyst and the organic materials which are to be oxidized. Catalysts suitable for coating the honey-comb substrate include but are not limited to platinum-based catalysts such as tetramine platinum nitrate $(NH_3)_4Pt(NO_3)_2$; mixtures of chloroplatinic acid, alumina, and dextrose such as are describe in co-pending U.S. patent application Ser. No. 348,075; or a solution of tetramine platinum nitrate of the formula $(NH_3)_4Pt(NO_3)_2$. A mixture of a platinum compound with a compound of another additive metal, such as palladium, rhodium, ruthenium, iridium, etc.; in various ratios, usually with the platinum compound predominating, are also useful in the practice of this invention. The catalyst material is deposited on the surfaces of the substrate, usually by dipping of the substrate into a dispersion or solution thereof and then drying or heat treating the coated substrate to fix the catalyst material on the substrate. The honey-comb substrate can be formed of Torvex, a ceramic made by the DuPont Corporation, or of similar materials manufactured by Dow Corning, Inc. or by Minnesota Mining and Manufacturing, Inc. Catalyst-coated granules of a silica/alumina substrate material are also useful as are other well-known refractory metal oxides. Other methods include the use of pellets, but are not limited to any one method for the effectiveness of this invention.

Referring now to the drawings, it can be seen relative to FIGS. 1, 5, and 9 that the invention can be configured as specific apparatus which can be fitted between the intake hood and the exhaust ducting typically used over a cooking surface. The flameless operation of the invention, at a temperature well below the flame temperature of the hydrocarbons which are to be removed from the air stream emanating from the cooking surface or other source of hydrocarbon-laden air, renders the invention particularly safe for use in situations where fire hazards from open flames can have serious consequences. The present apparatus is preferably installed in cooking situations in the ducting between the normal exhaust fan and the intake hood over the cooking surface and as close to the cooking surface as practicable. Use of the invenion in such situations results in a virtually odorless processed air stream being discharged from the restaurant, cleanliness being additionally maintained since the ducting and fan are left free of dust and grease.

Referring particularly now to FIGS. 1 through 4, a first embodiment of the present apparatus is seen at 10 to have an intake duct 12 at its lower end and an outlet duct 14 at its upper end. The intake duct 12 is typically located immediately above the source of a stream of hydrocarbon-laden or "unprocessed" air, such as in the duct which leads from an intake hood surmounting a cooking grill. The outlet duct 14 vents air which has been "processed" within the apparatus 10 either to the atmosphere or to other apparatus wherein the heat energy present in the processed air can be utilized. A fan 150 is typically disposed in the duct 14 to draw air flow through the apparatus 10. The apparatus 10 is structurally comprised of an outer cylinder 42 and an inner cylinder 32, the inner cylinder 32 being essentially concentrically mounted within the outer cylinder 42 by suitable structural supports. The space between the inner and outer cylinders is divided into alternating input passages 16 and output passages 18, the input passages 16 being designated as input passages 16A through 16H while the output passages are designated as 18A through 18H. The passages 16 and 18 effectively form the heat exchange portion of the apparatus 10. Unprocessed air entering the apparatus 10 through the intake duct 12 is deflected by deflector cone 20 into the input passages 16A through 16H, the passages 16A through 16H being open at openings 38A through 38H near the intake duct 12. The output passages 18A through 18H are closed near the intake duct 12 so that all of the unprocessed air is directed upwardly into the input passages 16A through 16H.

While the unprocessed air is moving upwardly through the input passages 16A through 16H, relatively warmer "processed" air is moving relatively thereto whithin the output passages 18A through 18H. Thus, heat is exchanged from the relatively warmer processed air to the unprocessed air, thereby raising the temperature of the unprocessed air. The origin and nature of the relatively warmer processed air will be described in more detail hereinafter. The unprocessed air, which contains hydrocarbons such as grease and odors in the form of fumes and vapors, is thus heated by heat exchange while rising in the input passages 16A through 16H. When the unprocessed air reaches the top of the passages 16, which passages 16 are closed at the tops thereof, the unprocessed air flows through openings 22A through 22H formed in the upper end of the inner cylinder 32. A deflector cone 28 assists, along with the suction created by the aforementioned fan, in changing the direction of the unprocessed air to cause said air to move downwardly over heating elements 34 disposed within the inner cylinder 32 by means of suitable structural supports (not shown). The heating elements 34 are preferably of the electric type such as the Chromalux elements used on commercial cooking apparatus, open flame not being provided by the elements 34. The heating elements 34 are preferably operated by thermostats 154 to provide sufficient heat energy to the flow of unprocessed air to cause the air to reach a desired temperature within the operating temperature range of a catalyst bed 36. The heating elements 34 can be disposed within the interior of the inner cylinder 32 and along the length thereof as shown, the elements 34 being rods. The rods may be horizontal, vertical, circular, in the form of a helix, or other configuration that provides greatest surface contact with the air stream. The heated unprocessed air passes through the catalyst bed 36 after passage over the heating elements 34, the catalyst bed being preferably of the type described hereinabove wherein a catalyst-coating honey-comb refractory element is held within a frame with screens covering the exposed surfaces of the element. The element would preferably by cylindrical in conformation to make flushly within the lower portion of the inner cylinder 32. The hydrocarbons or organic materials present in the airstream are oxidized by the catalyst material in the catalyst bed 36 essentially to carbon dioxide and water, the oxidation being accomplished without an open flame and at a temperature substantially less than the flame temperature of the organic material. Heat generated by this catalytic oxidation serves to additionally warm the air stream on passage through the catalyst bed 36. The now processed and relatively warm air flows out of the lower end of the inner cylinder 32 through openings 24A through 24H, which openings respectively communicate the interior of the lower end of the cylinder 32 with the interior of the output passages 18A through 18H. A deflector cone 26 assists in directing the air through the openings 24. The heated processed air passes upwardly through the output passages 18A through 18H and gives up heat through the walls of said passages to the unprocessed air moving upwardly within the input passages 16A through 16H as aforesaid. Thus, heat energy supplied to the processed air stream both by the heating elements 34 and by the catalytic oxidation of the organic materials in the air stream at the catalyst bed 36 is transferred to the unprocessed air stream to assist in elevating the temperature of the unprocessed air stream to a value within the operating temperature range of the catalyst in the bed 36. Thus, energy is not only conserved, the organic materials in the air stream actually serve to "fuel" the apparatus 10.

The processed air, which is now free of organic contaminating materials, flows upwardly out of the output passages 18A through 18H through openings 40A through 40H disposed at the respective upper ends of the passages 18. A deflector cone 30 assists in directing the air stream into a plenum 44 surmounting the inner cylinder 32, the processed air being drawn from the interior of the apparatus 10 through the outlet duct 14 as aforesaid. As can be further seen in FIG. 1 through 4 and particularly in FIG. 4, the inner and outer cylinders 32 and 42 can be formed into two hemicylindrical portions and hinged as by hinge 46 to allow opening of the apparatus 10 for maintenance. The apparatus 10 can be configured in shapes other than the cylindrical shape described, it being understood that description of the apparatus as cylindrical being for illustrative purposes only. The embodiments of the invention to be described relative to FIGS. 5 through 8 and relative to FIGS. 9 through 13 operate substantially in the same fashion as does the apparatus 10. In particular, the auxiliary heating elements, such as the elements 34, are of the same type and would typically have the ability to raise the temperature of the unprocessed air stream from a temperature as low as 125° F. at a flow rate of 1800 cubic feet per minute to a desired temperature within the operating range of the catalyst. The catalytic material used in the catalyst beds of the several embodiments, such as the bed 36, typically function most effectively within a temperature range of 375° F. to 475° F. Normal grease and odor-laden air streams emanating from cooking operations are effectively oxidized at a temperature of 400° F. Under normal condition, a thermostat 154 can modulate current to the heating elements 34 so as to maintain the desired temperature of the unprocessed air stream as said air stream passes through the catalyst bed 36 regardless of reasonable fluctuation in initial temperature of the air stream entering the intake duct 12 or of fluctuations in the applied suction of the fan typically used to draw flow through the apparatus 10. During operation of the apparatus 10 when substantial quantities of grease or the like is oxidized by the catalyst, the catalytic oxidation generates a substantial amount of heat energy which, when added to the unprocessed air stream by heat exchange between the passages 16 and 18, significantly reduces the amount of heat energy needed to be provided by the heating elements 34. A thermostat 154 is able to sense such a condition and the automatically reduce the amount of current supplied to the elements 34. In the event of failure or delay of such a thermostat, an automatic cutoff can be provided to disconnect the apparatus 10 when the temperature of the processed air exiting the apparatus exceeds a predetermined limit.

The several embodiments of the invention can actually use liquid greases or other organic materials which accumulate from other processes, such as other cooking processes in a restaurant and which must be disposed of, to fuel the apparatus. An auxiliary device 152 would be attached to the apparatus which would automatically feed the organic material into the unprocessed air stream, preferably prior to heat exchange with the processed air stream or before the bed 36. Oxidation of this additional organic material adds heat energy to the processed air stream, which heat energy can at least be partially transferred to the unprocessed air stream to lessen the heat energy required to be supplied by the heating elements 34. The auxiliary device need be no more complex than to compromise a metering pump and a small atomizer for spraying the organic material into the unprocessed air stream prior to entering the bed 36.

The embodiment of the invention shown in FIGS. 5 through 8 is seen to comprise apparatus 50 having an outer cylindrical shell 56, a middle cylinder 58, and an inner cylinder 60. The outer cylindrical shell 56 is reduced at its lower end to form an intake duct 52. Unprocessed air drawn into the apparatus 50 by means of a fan 150 of the like is deflected by a deflector cone 66 into input passages 68 which have a triangular cross-section. The passages 68 are disposed between the outer cylindrical shell 56 and the middle cylinder 58. The stand-offs 70 provide a rigid method of supporting shell 56 to keep it concentric with cylinder 58. Other methods of support may be used instead of the stand-offs 70. The unprocessed air stream changes direction at the top of the cylinder 58, passes through openings 76 in the upper end of the cylinder 58, and moves downwardly through passages 72 and past stand-offs 80 disposed in the space between the middle cylinder 58 and the inner cylinder 60 at the upper ends thereof. Additional heat is exchanged between the relatively warmer processed air moving upwardly through the interior 48 of the inner cylinder 60. The relatively more heated unprocessed air then passes over circular heating elements 64 disposed about the lower end of the inner cylinder 60 to pick up any additional heat energy required to elevate the temperature fo the unprocessed air to the temperature necessary for the efficient oxidation of the organic materials in the air stream on passage through catalyst bed 62, the now heated unprocessed air stream changing direction by deflector 74 to move upwardly through openings 78 in the lower end of the inner cylinder 60, then through the bed 62 and out through the outlet duct 54. Operation of thermostat 154 and grease disposal unit 152 are the same as described hereinbefore for the first embodiment.

Figure 14:
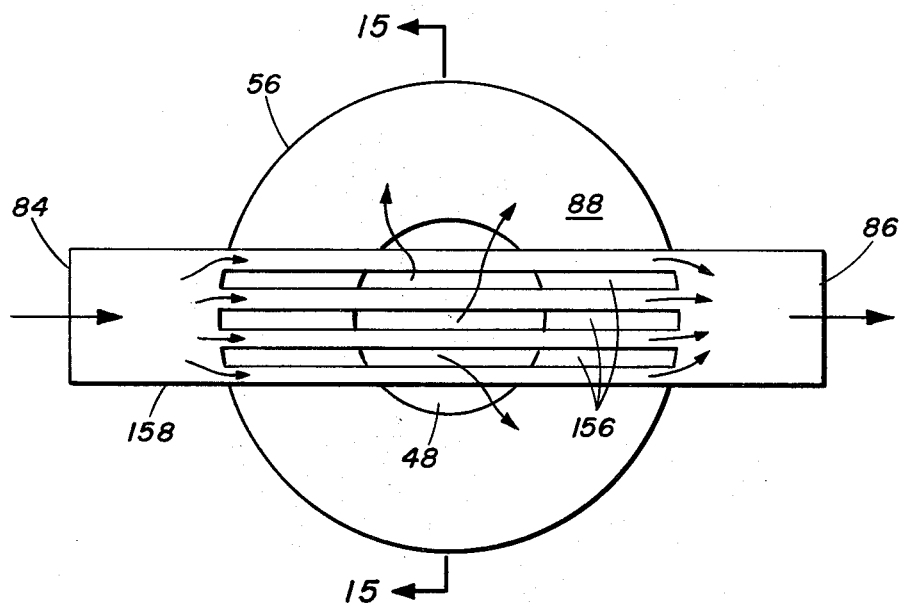
FIG. 14 is an idealized section taken along line 14—14 of FIG. 5.
Figure 15:
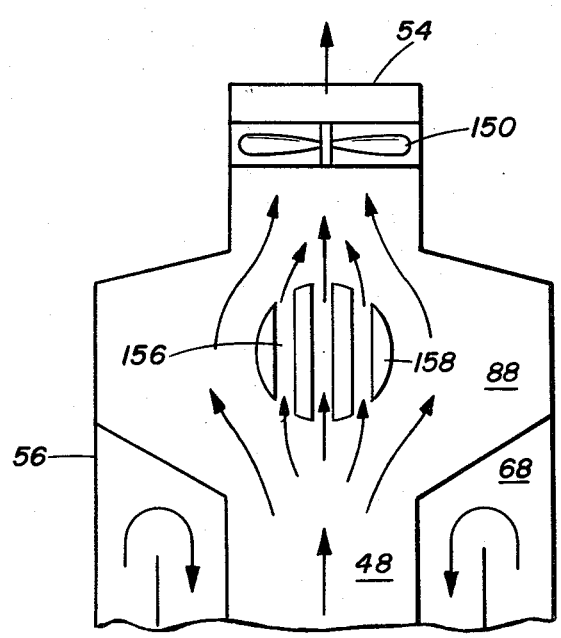
FIG. 15 is an idealized section taken along line 15—15 of FIG. 14.

The apparatus 50 has a heat recovery section 88 surmounting the shell 56 and inner cylinder 60, the section 88 having an intake 84 and outlet 86. The relatively warm processed air is passed through the adjunct heat exchanger 158 to heat air for room heating to operate air conditioning system, or to heat water, all described hereinafter. This heat exchanger is typical of those which may be added to all embodiments of this invention. Heat exchanger 158 passes through heat recovery section 88. The heated processed air stream from the interior 48 passing through the recovery section 88 in FIGS. 14 and 15 flows around heat exchanger 158 and through slots 156 in heat exchanger 158, thereby transmitting heat through the walls of slots 156 to the interior passages of heat exchanger 158 where the flow of air passing from intake 84 to outlet 86 is elevated in temperature by the heat received by the heat exchanger 158 through the walls of slots 156.

The apparatus 90 of FIGS. 9 through 13 is of a rectangular design and as such, intake duct 92 could typically comprise an intake hood disposed above a cooking grill. Unprocessed air entering the apparatus 90 through the intake duct 92, (drawn in by fan 150), deflected by deflector 100, passes through openings 102A through 102D and into rectangular passages 96A through 96D. Relatively warmer processed air passes upwardly through rectangular passages 98A through 98D, which passages 98 alternate within the rectangular space located between a rectangular outer shell 108 and a rectangular inner shell 110. Heat is thus exchanged from the processed air to the unprocessed air as described hereinabove. Openings 104A through 104D in the upper end of the inner shell 110 communicate the passages 96A through 96D with the interior of the inner shell 110, the unprocessed air deflected by deflector 106 passing downwardly over heating rods 112 disposed within the inner shell 110 and then through catalyst bed 114. Operation of thermostat 154 and grease disposal unit 152 are the same as described hereinbefore for the first embodiment. The processed air stream deflected by deflector 124 then exits the inner shell 110 through openings 116A through 116D which open into the passages 98A through 98D, the processed air moving upwardly through said passages 98A through 98D and giving up heat through the walls of said passages to the unprocessed air stream flowing upwardly in the passages 96A through 96D. The processed air exits the passages 98A through 98D at the upper ends thereof through openings 118A through 118D channelled by deflector 122 and flows into the plenum 120 and then out of the apparatus 90 through an outlet duct 94.

As should be apparent from the description provided of three embodiments of the invention, other heat exchange structures could be employed in the apparatus of the invention without departing from the scope of the invention as defined by the appended claims.

CLAIMS

What is claimed is:

1. Heat conserving catalytic apparatus for removing of oxidizable components in a waste gas stream, comprising, a housing shell means having an inner wall as well as a gas stream inlet means formed in its upstream end and a gas stream outlet means formed in its downstream end, said housing shell means being formed in two sections along the longitudinal direction thereof;

an interior shell means having an outer wall and spaced from said inner wall of said housing shell means to form a heat exchange zone therebetween; said interior shell means being formed into two sections along the longitudinal direction thereof; said interior shell means being opened at both ends and having a longitudinally extending combustion chamber on the interior thereof to define a plenum area;

means for allowing facile opening of said two sections of said housing shell means and said two sections of said interior shell means along the longitudinal direction of said housing shell means and said interior shell means for access to the interior thereof;

a ducting structure within said heat exchange zone, said ducting structure means consisting of alternating input and output ducts, said input ducts receiving the unprocessed waste gas stream from said gas stream inlet means, and said outlet ducts receiving the processed waste gas stream from said combustion chamber;

a plurality of inlet ports formed as a part of the interior shell means and located at the upstream end of said combustion zone for communicating said plurality of inlet ducts designated for said unprocessed waste gas stream from said heat exchange zone with said combustion zone;

first and second baffle means being positioned at the upstream and downstream ends, respectively, of said interior shell means to define said plenum space for the combustion zone and to close off the ends of the respective output and input ducts in said heat exchange zone; said second baffle means forming a deflecting area therein for passage of said unprocessed waste gas stream from said heat exchange zone in the upstream end of said combustion zone in said interior shell means;

a plurality of outlet ports at the downstream end of said combustion zone in said interior shell means communicating said combustion zone with said plurality of outlet ducts designated for the outgoing processed waste gas stream;

an auxiliary heating means disposed within said combustion chamber to further heat said incoming unprocessed waste gas stream after passage through the heat exchange zone;

a catalytic means disposed within said combustion zone and spaced downstream from said auxiliary heating means for flamelessly removing the oxidizable components of the waste gas stream from said waste gas stream, oxidizing of said oxidizable components occurring to release at least some heat energy, the relatively warmer processed oxidized gas stream being ducted from said combustion zone into the heat exchange zone and passing into countercurrent relative to the relatively cooler unprocessed waste gas stream entering the heat exchange zone to elevate the temperature of said cooler incoming unprocessed waste gas stream;

thermostatic means spaced between said auxiliary heating means and said catalytic means for controlling the temperature of said waste gas stream; and means for inducing the flow of the waste gas stream through said heat conserving catalytic apparatus.

2. The heat conserving catalytic apparatus of claim 1, wherein said ducting structure means comprises a plurality of inner walls disposed within the space between the housing shell means and the interior shell means, the walls defining ducts within said heat exchange zone, the unprocessed waste gas stream being ducted within alternate ducts from said inlet means into the heat exchange zone while the relatively warmer oxidized processed gas stream being ducted within the ducts disposed adjacent to said alternate ducts, said oxidized processed gas stream being ducted from the combustion zone to the outlet means through said heat exchange zone to exchange heat energy with the unprocessed waste gas stream through the walls of the ducts on movement therethrough.

3. The heat conserving catalytic apparatus of claim 1, wherein said ducting structure means comprises a plurality of radial walls between said inner wall of said housing shell means and said outer wall of said interior shell means forming a plurality of ducts, wherein the alternate ducts so formed around the periphery thereof are inlet ducts for the incoming unprocessed waste gas stream and outlet ducts for outgoing processed waste gas stream respectively, and wherein said radial walls between said alternate ducts perform heat exchange between countercurrents of said outgoing processed waste gas stream and said incoming unprocessed waste gas stream.

4. The heat conserving catalytic apparatus of claim 1 wherein said auxiliary heating means is flameless.

5. The apparatus of claim 1 wherein said thermostatic means for controlling temperature of the waste gas stream is situated for sensing the temperature of said unprocessed waste gas stream prior to passage thereof in proximity of said auxiliary heating means, said thermostatic means controlling the application of heat to said incoming unprocessed waste gas stream from said auxiliary heating means in response to the temperature of said unprocessed waste gas stream, heat being added to said incoming unprocessed waste gas stream from said auxiliary heating means in the event that temperature of said incoming unprocessed waste gas stream is lower than the lowest temperature within the operating temperature range of said catalytic means, the application of heat to the incoming unprocessed waste gas stream being discontinued in the event that the temperature of the unprocessed waste gas stream is within the operating temperature range of said catalytic means.

6. The heat conserving catalytic apparatus as recited in claim 1, wherein said catalytic means includes a substrate and a catalyst material mounted on said substrate.

7. The heat conserving catalytic apparatus as recited in claim 6, wherein said catalyst material contains platinum.

8. The heat conserving catalytic apparatus as recited in claim 7, wherein said substrate is formed of honeycomb structure and said catalyst material is coated on the surfaces of said honey-comb structure.

9. The heat conserving catalytic apparatus as recited in claim 1, and further comprising means for injecting hydrocarbons into said unprocessed waste gas stream prior to passage thereof through said heat exchange zone.

10. The heat conserving catalytic apparatus as recited in claim 1, wherein said auxiliary heating means includes electrical heating elements.

11. The heat conserving catalytic apparatus as recited in claim 1, wherein said inlet and outlet ducts are of triangular cross-section.

12. The heat conserving catalytic apparatus as recited in claim 1, wherein the operating temperature range of the catalytic means is between 357° F. and 475° F.

* * * * *